United States Patent [19]

Bodlaj

[11] 4,309,103
[45] Jan. 5, 1982

[54] DEVICE FOR CONTACT-FREE THICKNESS OR INTERVAL MEASUREMENT

[75] Inventor: Viktor Bodlaj, Munich, Fed. Rep. of Germany

[73] Assignee: Siemens Aktiengesellschaft, Berlin & Munich, Fed. Rep. of Germany

[21] Appl. No.: 113,329

[22] Filed: Jan. 18, 1980

[30] Foreign Application Priority Data

Feb. 8, 1979 [DE] Fed. Rep. of Germany ....... 2904833

[51] Int. Cl.³ .......................... G01C 3/00; G01C 5/00; G01C 3/08
[52] U.S. Cl. ............................................ 356/1; 356/4
[58] Field of Search ........................................ 356/1, 4

[56] References Cited

U.S. PATENT DOCUMENTS 4,053,227 10/1977 Bodlaj ..................................... 356/1

OTHER PUBLICATIONS

Siemens Forschungs-und Entwicklungsbericht, vol. 4, 1975, No. 6, pp. 336-344.
Siemens Forschungs-und Entwicklungsbericht, vol. 6, 1977, No. 3, pp. 180-188.

*Primary Examiner*—S. C. Buczinski
*Attorney, Agent, or Firm*—Hill, Van Santen, Steadman, Chiara & Simpson

[57] ABSTRACT

A device is disclosed for contact-free thickness or interval measurement wherein a light source generates a light ray beam which is periodically deflected. A beam divider divides out a light ray beam for reception by first and second light-sensitive detectors which receive light only along a specific optical axis. At least one third light-sensitive detector is provided whose optical axis intersects the light ray beam at a reference plane. Electronic evaluation means are provided for generating from signals of the first, second, and third detectors a control voltage corresponding to a deflection time of the light ray beam and also at least one voltage impulse which is a measure of an interval of a surface of a measured object from the reference plane. A reference voltage is provided and means are provided for generating a corrected reference voltage by changing the reference voltage in a direction opposite to a deviation of the control voltage from a normal operating voltage. An impulse/digital converter receives the voltage impulse and provides a digital output which is connected to a digital/analog converter which creates an analog output based upon the corrected reference voltage and the digital input.

4 Claims, 1 Drawing Figure

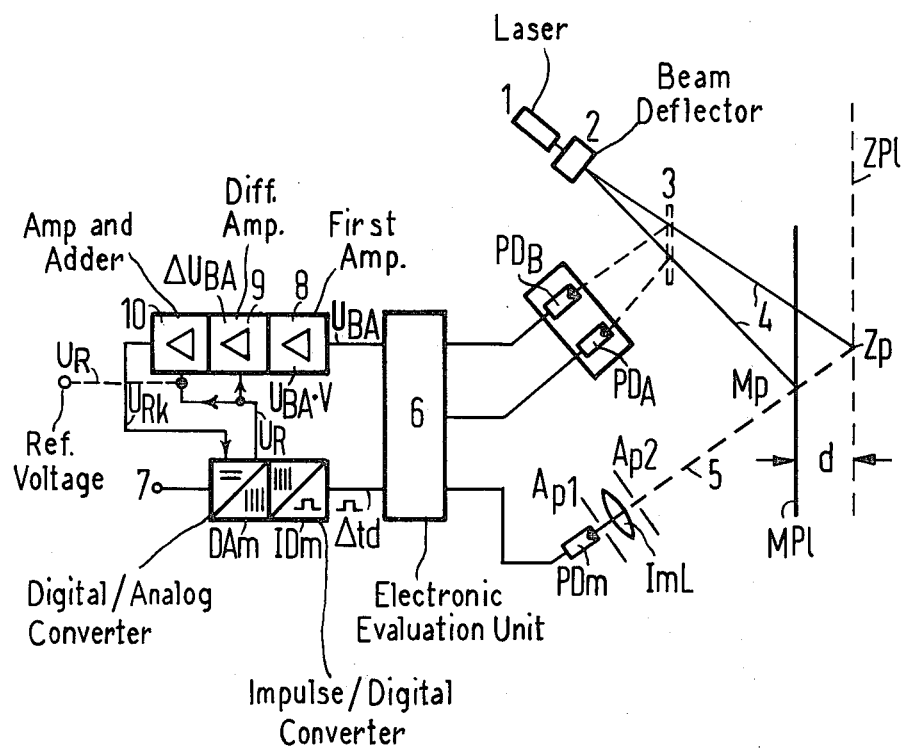

DEVICE FOR CONTACT-FREE THICKNESS OR INTERVAL MEASUREMENT

BACKGROUND OF THE INVENTION

The invention relates to a device for contact-free thickness or interval measurement comprising a light source for the generation of a sharply concentrated light ray beam in a given direction. A beam deflector is provided for the periodic movement of the light ray beam at right angles to the given direction. A beam divider is connected to the beam deflector, and first and second light-sensitive detectors are positioned at a region where the light ray beam is divided out of the given direction by means of the beam divider. Each detector only registers light from a specific direction (detector with an optical axis). At least one third light-sensitive detector is provided whose optical axis intersects the light ray beam at a zero plane. An electronic evaluation unit generates from the detector signals a control voltage corresponding to the excursion or deflection time of the light ray beam between the first and second detector and at least one voltage pulse which is a measure of the distance of a surface of a measured object from the zero plane. An impulse/digital converter is also provided to which the voltage pulse is supplied, and a digital/analog converter is connected thereto whose reference voltage can be connected through in accordance with the output value of the impulse/digital converter.

In a known device of this type (Siemens Forschungs- sund Entwicklungsbericht, Vol. 6 (1977), No. 3, pages 180–188), incorporated herein by reference, the thickness or interval measurement is based on the determination of the deflection or excursion time which the light ray beam requires in order to arrive from a specific point on the zero plane to a specific point on the measured object. The deflection or excursion time does not depend solely on the interval between the two points, but, rather, also depends on the deflection velocity of the light ray beam. Since the deflection of the light ray beam is periodically repeated, the deflection velocity depends both on the deflection frequency as well as on the deflection amplitude. This means that each change of the deflection frequency or of the deflection amplitude changes the deflection velocity, and, thus produces a measuring fault. Given rapid measurements in which the measured value must be determined at each individual excursion, this measuring fault can also not be entirely avoided by means of a stabilization circuit for the deflection velocity.

It is already known from the report discussed above to eliminate the measuring fault caused by the change of the deflection velocity by connecting the measured value during evaluation according to the following equation:

$$\Delta t_{dk} = (\Delta t_N / \Delta t_{BA}) \Delta t_d \qquad (1)$$

Here, $\Delta t_N$ is a time standard; $\Delta t_{BA}$ is the time which the light ray requires in order to arrive from a first photo diode which determines the zero plane to a second photo diode which specifies the excursion or deflection time; $\Delta t_d$ is the actual and $\Delta t_{dk}$ is the corrected measuring time. This is calculated after digitalization of the measured times with the assistance of the microcomputer.

For most applications, it is necessary that the measured times exist not only in digital, but also in analog form, so that a direct control, for example, of the amplitude of the light ray beam or—upon employment of such a device for monitoring the thickness of rolled goods—for the control of the drum interval can be undertaken.

In many cases, not even the precise calculation of the measured thickness or of the measured interval is required. It is precisely in such cases that a microcomputer for the correction of the measuring time would represent a significant additional expense.

SUMMARY OF THE INVENTION

An object of the present invention is to correct the measuring time in an analog manner at least approximately according to the above described equation in a system of the type described above.

This object is inventively achieved in that, given a deviation of the control voltage from a rated voltage, the reference voltage can be changed in a direction opposite to the deviation. Let it be assumed that the deflection velocity of the light ray beam has increased. This would result in the excursion time of the light ray beam between the first and second detector becoming shorter. Accordingly, the control voltage would also become smaller. The width of the voltage pulse and the digital value derived therefrom would also become smaller. At the same time, however, the reference voltage required for the digital/analog conversion would be increased with respect to amount and the measured value which would otherwise appear to be too small because of the increased deflection velocity is corrected to the standard value. This same operation is also true when the deflection velocity is reduced. In this case, the control voltage will become greater. At the same time, the reference voltage of the digital/analog converter decreases in terms of amount. Therefore, the measured value which otherwise would appear to be too large because of the slow excursion or deflection, is reduced to the standard value. By means of changing the reference voltage, a correction according to the following equation is carried out:

$$U_{dk} = (U_d \cdot U_{Rk} / U_R) \qquad (2)$$

Therefore, $U_d$ is the analog measuring value corresponding to $\Delta t_d$; $U_R$ is the fixed reference voltage; $U_{Rk}$ is the corrected reference voltage; and $U_{dk}$ is the corrected analog measuring value. Equation (2) does not completely fulfill equation (1). Since the errors for the deflection velocity normally remain below 1%, the deviation is negligibly small.

Up to now, there has been mention only of a voltage pulse and, thus, the possibility of interval measurement. If the thickness of a measured object is to be determined, then a further detector for a second interval measurement and a further impulse/digital converter and a digital/analog converter are required for that purpose. Since an error in the deflection velocity has the same influence on both interval measurements, the reference voltage of the further digital/analog converter must also be changed for the correction.

With the invention, an amplifier is provided which is connected at its input side with the control voltage and whose amplification factor is selected in such manner that, without a deviation (control voltage equal to rated voltage), the control voltage is amplified to the reference voltage required for this case. An output of this amplifier is connected to the input of a differential amplifier already provided with said fixed reference voltage. An output of the differential amplifier is connected to the input of a summation amplifier likewise provided with the fixed reference voltage. An output voltage of this summation amplifier represents the variable reference voltage.

The control voltage is first amplified in an amplifier to the reference voltage required for the normal case. In the normal case, there then results a voltage of zero at the output of the differential amplifier, i.e., the reference voltage of the digital/analog converter remains unchanged. If the control voltage deviates from the rated voltage, then a differential voltage ensues which is added to the fixed reference voltage.

BRIEF DESCRIPTION OF THE DRAWING

The drawing FIGURE shows a device for interval measurement together with a block diagram for the analog correction of the measured value.

DESCRIPTION OF THE PREFERRED EMBODIMENTS

Except for the block diagram, the device is known, for example, from Siemens Forschungs-und Entwicklungsbericht, Volume 4, (1975), Number 6, pages 336-344, particularly FIG. 8 and the related description, incorporated herein by reference.

As a light source, the device has a laser 1 whose sharply concentrated light beam strikes a beam deflector 2. A beam divider 3 is arranged behind the beam deflector 2 with the assistance of which beam divider 3 a part of the light ray beam 4 is divided out. Two photo diodes $PD_B$ and $PD_A$ which can only respectively absorb light from a specific direction, are situated in the area of this divided-out light ray beam. Further, a photo diode $PD_m$ is provided which can likewise only accept light from a specific direction. For this purpose, aperture stops $A_{P1}$, $A_{P2}$ and an imaging optics ImL are provided which form an optical axis or, respectively, the imaging direction.

At a specific point in time, the light ray beam 4 is directed in such manner that it intersects the optical axis 5 at a zero plane ZP1 at point Zp. At the same point in time, the partial beam cut out by means of the beam divider 3 is cast onto the photo diode $PD_B$, i.e., this detector emits a signal at this point in time. At a later point in time, the optical axis 5 and the light ray beam intersect at point $M_P$ on the plane MP1 of the measured object, so that the scattered light from the surface of the measured object is captured by the photo diode $PD_m$ and can generate a measuring signal. The point $M_P$ has the interval d from the zero plane ZP1.

The interval measurement is based on a measurement of the time which the periodically deflected light ray beam 4 requires at each excursion in order to arrive from the initial point $Z_p$ to the measuring point $M_p$. The time which the light ray beam divided out by means of the beam divider 3 requires in order to arrive from detector $PD_B$ to detector $PD_A$ is a measure of the deflection velocity of the light ray beam.

The detector signals are supplied to an electronic evaluation unit 6 which generates a control voltage $U_{BA}$ corresponding to the deflection velocity of the light ray beam from the signals of detectors $PD_B$ and $PD_A$ and generates a voltage impulse from the detector signals of photo diodes $PD_B$ and $PD_m$, the width $\Delta t_d$ of said voltage pulse representing a measure of the interval to be measured. This electronic evaluation unit 6 is known, for example, from the Siemens Forschungs-und Entwicklungsbericht, Volume 4 (1975), Number 6, page 340, FIG. 8, incorporated herein by reference. The voltage impulse with the width $\Delta t_d$ is digitalized in an impulse/digital converter $ID_m$. In a subsequent digital-/analog converter $DA_m$, the digital value is converted into an analog value which is available at an output 7 as a measure for the interval to be measured. The digital-/analog converter $DA_m$ normally functions with an internal (or possibly external) reference voltage $U_R$ which is connected through to the output in accordance with internal switching controlled by the bit number and digital input. In the present sample embodiment, this reference voltage used for digital-analog conversion is corrected according to the invention when the deflection velocity changes. For this purpose, the control voltage $U_{BA}$ which corresponds to the deflection velocity is amplified in a first amplifier 8 to the reference voltage required for the normal case. The amplification factor V of the amplifier 8 is selected in such manner that, without a deviation, the reference voltage $U_R$ is derived at the output of the amplifier 8, i.e., the control voltage $U_{BA}$ is equal to the rated voltage. The output voltage of the amplifier 8, together with said fixed reference voltage $U_R$, is supplied to a differential amplifier 9. In the normal case, the differential voltage at the output of the differential amplifier 9 is equal to zero ($U_{BA} \cdot V = U_R$). When the deflection velocity and, thereby, the control voltage $U_{BA}$ changes, a voltage $$\Delta U_{BA} = U_R - U_{BA} \cdot V \lessgtr 0$$

arises at the output of the differential amplifier 9. This differential voltage $\Delta U_{BA}$ is added to the fixed reference voltage $U_R$ in a further amplifier 10. Thus, $$U_{Rk} = U_R + \Delta U_{BA}$$

is derived at the output of this amplifier 10 as the corrected reference voltage for the digital/analog converter. If, for example, the deflection velocity increases for any reason whatsoever, then the time which the light ray beam requires in order to travel from the photo diode $PD_B$ to the photo diode $PD_A$ is shorter and, accordingly, the control voltage $U_{BA}$ is smaller. Therefore, a positive differential voltage $\Delta U_{BA}$ arises at the output of the differential amplifier 9, said voltage being added to the positive fixed reference voltage $U_R$. By so doing, the reference voltage required for the digital-/analog conversion is increased in terms of amount and the measured value otherwise appearing to be too small because of the increased deflection velocity is corrected to the normal value. The analogous case is true when the deflection velocity is reduced.

In the present sample embodiment, it is important to note that the fixed reference voltage $U_R$ may be directly taken from a reference voltage source in the digital-/analog converter $DA_m$. However, it is likewise possible to employ a separate reference voltage source such as shown by dotted lines and $UR'$. In any case, this fixed reference voltage is compared with the reference voltage output at amplifier 8.

Under certain conditions, it can also be expedient to first also amplify in intermediate fashion the fixed reference voltage $U_R$, for example, for the purpose of operational sign inversion.

In further explanation for the operation of converter DAm, the following is noted. The converter DAm customarily contains an internal reference voltage source which produces a reference voltage UR which is typically constant. An example for this converter as used in the present application is cited in the book "Halbleiter Schaltungstechnik" [Semiconductor Circuitry Engineering] by U. Tietze and Ch. Schenk, Springer Publishing Company, 1976, page 594, section 18.95, incorporated herein by reference. There, the reference voltage is applied to a summation amplifier via parallel switches and resistances which correspond to digital place values.

In the case of the invention, the constant reference voltage UR is replaced or substituted by said corrected reference voltage URK, which depends upon the control voltage and thus upon the deflecting span velocity. Therefore, different analog signals result in the case of the same digital signal. The corrected reference voltage is not added to the analog signal. It can be generated from the internal constant reference voltage UR of the converter DAm, or from the separate voltage source UR'.

As is known, for example, from the Siemens Forschungs- und Entwicklungsbericht, Volume 6 (1977), Number 6, page 185, FIG. 14, incorporated herein by reference, for a thickness measurement a further photo diode would have to be provided. Likewise, the evaluation electronics would have to generate a further voltage impulse as a function of the signal of this further photo diode, which voltage impulse is in turn again supplied to an impulse/digital converter and a digital/analog converter connected thereto. The difference of the output signals of these two digital/analog converters is then a measure for the thickness of the measured object. The reference voltage of this further digital/analog converter would also have to be corrected. The same correction circuit can be employed for both digital/analog converters.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A device for contact-free thickness or interval measurement, comprising:
   light source means for generating a sharply concentrated light ray beam in a prescribed direction;
   a beam deflector means for periodic deflection of the light ray beam at right angles to the prescribed direction;
   a beam divider positioned after the beam deflector;
   a first and second light-sensitive detector at a region of a light ray beam divided out from the prescribed direction by the beam divider, the first and second detectors having an optical axis receiving light from a specific direction;
   at least one third light-sensitive detector whose optical axis intersects the light ray beam at a reference plane;
   electronic evaluation means for generating from signals of the first and second detectors a control voltage corresponding to a deflection time of the light ray beam between the first and second detectors and also generating from signals of the first and third detectors at least one voltage impulse which is a measure of an interval of a surface of a measured object from the reference plane;
   an impulse/digital converter to which the voltage impulse is supplied;
   means for creating a reference voltage;
   means for generating a corrected reference voltage by changing the reference voltage in a direction opposite to a deviation of the control voltage from a normal operating voltage; and
   a digital/analog converter means for creating an analog output based upon the corrected reference voltage and digital output from the impulse/digital converter.

2. A device according to claim 1 wherein an amplifier is provided to whose input the control voltage is connected and whose amplification factor is selected such that without said deviation of the control voltage from the normal voltage the control voltage is amplified to the reference voltage; an output of this amplifier connecting to a differential amplifier whose other input is connected to the reference voltage, and whose output is connected to the input of an adder amplifier whose other input connects to the reference voltage, the output voltage of said adder amplifier representing said corrected reference voltage.

3. The device of claim 1 wherein the means for creating a reference voltage is included within the digital/analog converter means.

4. A device for contact-free measurement of a surface relative to a reference plane, comprising:
   light source means for generating a light ray beam in a prescribed direction;
   beam deflector means for periodic deflection of the light ray beam from the prescribed direction;
   beam divider means for dividing a portion of the beam in a direction of first and second lightsensitive detectors which receive light from a specific direction;
   a third light-sensitive detector for receiving light reflected from the surface being measured;
   electronic evaluation means for generating from signals of the first and second detectors a control voltage corresponding to a deflection time of the light ray beam between the first and second detectors and also generating from signals of the third detector at least one voltage pulse which is a measure of an interval of a surface of a measured object from the reference plane;
   means for creating a reference voltage;
   means for generating a corrected reference voltage by changing the reference voltage in a direction opposite to a deviation of the control voltage from a normal operating voltage indicative of normal periodic deflection of the light ray beam;
   an impulse/digital converter to which the voltage pulse is supplied; and
   a digital/analog converter means for creating an analog output derived from the corrected reference voltage and a digital output from the impulse/digital converter.

* * * * *